Jan. 6, 1942.   H. O. DROTNING   2,269,148
FOLDING CAMERA
Filed June 12, 1940
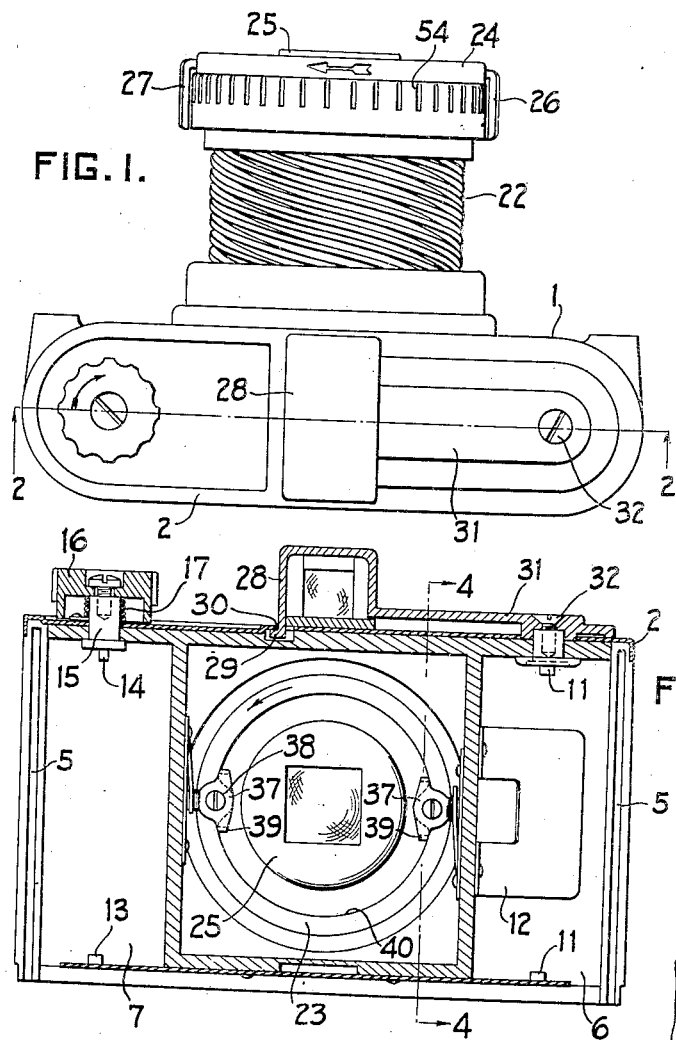
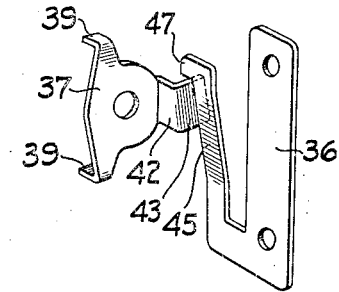
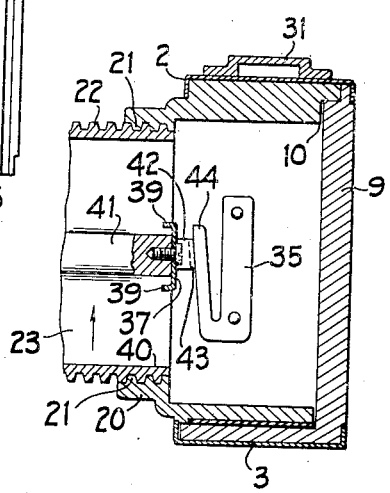
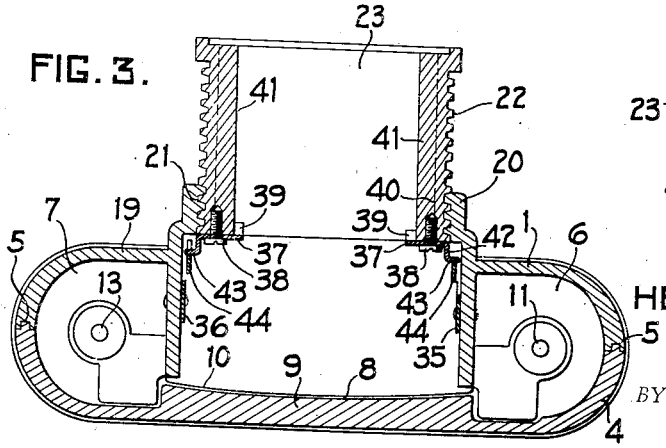
HENRY O. DROTNING
INVENTOR
BY Newton M. Perrins
Donald H. Stewart
ATTORNEYS Patented Jan. 6, 1942

2,269,148

UNITED STATES PATENT OFFICE 2,269,148

FOLDING CAMERA

Henry O. Drotning, Rochester, N. Y., assignor to Eastman Kodak Company, Rochester, N. Y., a corporation of New Jersey Application June 12, 1940, Serial No. 340,138

9 Claims. (Cl. 95—39)

This invention relates to photography and more particularly to cameras.

One object of my invention is to provide a camera of the collapsible type which may be moved to and from an operative or picture-taking position. Another object of my invention is to provide a camera of the type including a screw-out front with the threaded members so formed that they can be moved with very slight pressure throughout the normal range of their movement and when the parts are substantially in a picture-taking position, with a means for applying pressure to the relatively movable parts to firmly position the front extension in an operative position. Another object of my invention is to provide a means for moving and limiting the movement of a front extension relative to a camera body and other objects will appear from the following specification, the novel features being particularly pointed out in the claims at the end thereof.

In the drawing, in which like reference numerals denote like parts throughout:

Fig. 1 is a top plan view of a camera constructed in accordance with a preferred embodiment of my invention.

Fig. 2 is a section taken on line 2—2 of Fig. 1.

Fig. 3 is a transverse section through the camera shown in Fig. 1, with parts being removed to better illustrate the features of my invention.

Fig. 4 is a fragmentary detail section taken on line 4—4 of Fig. 2.

Fig. 5 is a detail perspective of a spring and bracket used in the camera shown in the preceding figures.

In the embodiment illustrated, the camera may consist of a camera body 1 which is preferably made of a molded composition with metallic caps for the top 2 and bottom 3. The camera body may be arranged so that the camera back section 4 may slide relative to the body 1 on tongue and groove connections 5 with the camera body so as to expose a supply spool chamber 6 and a take-up spool chamber 7, the film being drawn from the former to the latter through a passageway 8 between the camera back 9 and the exposure frame 10.

A film spool may be positioned in the supply spool chamber 6 on the spool centering pins 11, and I prefer to provide a spring 12 for exerting a light tension on the film spool. The take-up spool may be mounted upon the centering pin 13 and may be engaged by a coaxially arranged winding web 14, carried by the post 15 and movable by the handle 16. A known type of one-way clutch in the form of a coiled spring 17 is employed to permit the rotation of the handle 16 only in a winding direction.

The front wall 19 of the camera is provided with an outwardly extending ring 20 which is internally threaded at 21 to receive the external thread 22 on the tubular extension 23 which carries a shutter 24 on its outer end, in which the camera objective is shown as being mounted in a lens cell 25. The shutter is equipped with the usual trigger 26 and time stop lever 27.

On the top wall of the camera, I prefer to mount a finder in a housing 28 which may be attached to the camera by means of an L-shaped lug 29 passing through an aperture 30 in the top metallic plate 2 and which may also be provided with an arm or extension 31 which is also attached to the top wall of the camera by means of a screw 32.

As thus far described, the camera may be of known construction.

In the past, considerable difficulty has been encountered in providing threaded sections, particularly when made of moldable material, so that the threaded parts move quite freely to facilitate opening up and collapsing the camera and at the same time providing threaded members which will hold the camera objective sufficiently rigidly in a picture-taking position. If the threads are made of a sufficiently close fit to hold the lens accurately in its operative position, the two threaded members turn with considerable difficulty. To overcome these objections, I have purposely provided the threads 21 and 22 with a comparatively loose fit, enabling the extension to be quickly and easily turned through the major part of its movement, and, in addition, I have provided means for rigidly holding edges of the mating threads in extremely close contact when the camera parts are moved to a picture-taking position.

In order to accomplish this result, I have provided on the back of the camera body 1, a pair of spring members which are different in construction, one spring member 35 being illustrated in Fig. 4, and the other spring member 36 being illustrated in Fig. 5. Each of these spring members is provided with a spring arm, which is adapted to exert an axial thrust on the tubular extension 23.

The tubular extension 23 is provided with a pair of similar brackets 37, which are oppositely disposed and which are preferably attached to the molded tubular extension by means of screws 38. Each of these brackets has a pair of downwardly extending lugs 39 to engage the inside flange 40 of the tubular extension, the screws 38 passing into ribs 41 formed on the inside of the tubular member. Each of the brackets 37 is provided with an arm bent upwardly at 42 and outwardly at 43, the outward forming, as best illustrated in Fig. 4, being slightly wedge-shaped so that when this forming is brought beneath the spring arm 44 of the spring 35, or the spring arm 45 of the spring 36, these two spring members may exert an axial pressure tending to thrust the tubular extension 23 axially and away from the camera body. This naturally applies pressure to facing edges of the threads 21 and 22 and holds the parts rigidly after the wedge-shaped members 43 slide under the spring arms 44 and 45 which are also wedge-shaped or arranged at a corresponding angle to the wedge-shaped edges 43. Thus, when the camera front 23 is screwed outwardly, at the end of its outward movement the spring members 44 and 45 engage the wedge-shaped ends 43 of the brackets and thrust outwardly on the tubular extension 23. In addition, the spring member 36 is provided with a lug 47 which limits the rotative movement of the bracket 37 and brings the turning movement of the extension 23 to a stop after the springs 45 and 44 have been brought into an operative position with respect to the similar brackets 37.

There is an additional advantage in this construction, since it has normally been necessary with cameras having screw fronts, to provide a stop flange on the extensible member so that this member can be screwed outwardly only until it comes in contact with the front wall of the camera. I provide no such flange, but utilize the brackets 37 as a means for limiting the outward movement of the tubular extension so that these brackets can be applied after the screw threads are brought into engagement in assembling the camera, so that the diameter of the threaded members need not be made such as will pass through the exposure frame 10, nor is it necessary to provide an exposure frame which can be assembled after the camera front is assembled to the camera body. Thus, the brackets 7 permit the use of a relatively large diameter front extension which is very desirable particularly when objectives of comparatively large aperture are used.

With a camera constructed as described above, the fit of the threads 21 and 22 is a loose one, so that the front can be extended by giving a rapid twist to the shutter member 24 which may be conveniently knurled as by knurlings 54. This movement causes the front to move out rapidly, particularly where, as in the present case, I use a multiple thread of relatively steep pitch. Toward the end of the opening movement, the brackets engage the spring arms 44 and 45 which thrust large areas of the facing threads together with increasing tightness as the turning movement continues until it is finally brought to a stop by means of the lug 47 on the spring member 36. The parts are now in a relatively rigid picture-taking position and the objective is held accurately and axially of the tubular extension 23 and exposure frame 10. In order to collapse the camera into an inoperative, folded position, a reverse movement is applied to the shutter member 24, disengaging the brackets 37 from their cooperating spring members 35 and 36.

I have found that with a camera of approximately the dimensions shown in the drawing, a pair of brackets 37 spaced opposite to each other is all that is required to hold the parts in a sufficiently rigid picture-taking position to obtain first class results. However, I have used different numbers of brackets spacing them evenly around the inner periphery of the extension tube 23 and if larger cameras are desired, three or more brackets may be found useful. It is only necessary to provide one stop lug 47 and if more than two brackets are employed, the spring members for the additional brackets may be conveniently formed like spring member 35 with the spring arm 44 which serves only to exert an axial thrust on the individual bracket.

What I claim is:

1. In a collapsible camera including a camera body and a camera front having a threaded connection with the camera body on which the front may turn to and from an operable or picture-taking position, a wedge-shaped member and a spring member positioned to contact therewith forming a two-part camera front locating device, said camera front carrying one part and said camera body carrying the other part, whereby the turning of the camera front may cause the wedge-shaped member and spring to frictionally engage and hold the camera parts in fixed relationship.

2. In a collapsible camera including a camera body and a camera front having a threaded connection with the camera body on which the front may turn to and from an operable or picture-taking position, a wedge-shaped member and a spring member positioned to contact therewith forming a two-part camera front locating device, said camera front carrying the wedge-shaped member and the camera body carrying the spring member in such a position that the two-part front locating device may be forcibly engaged by unscrewing the lens front relative to the camera body into a picture-taking position.

3. In a collapsible camera including a camera body and a camera front having a threaded connection with the camera body on which the front may turn to and from an operable or picture-taking position, a wedge-shaped member and a spring member positioned to contact therewith forming a two-part camera front locating device, said camera front carrying one part and said camera body carrying the other part, said spring member including a spring arm having a wedge engaging surface of substantial length and of an inclination approximately that of the wedge-shaped member, whereby both members may be readily engaged and the front may be frictionally retained in a picture-taking position.

4. In a collapsible camera including a camera body and a camera front having a threaded connection with the camera body on which the front may turn to and from an operable or picture-taking position, a wedge-shaped member and a spring member positioned to contact therewith forming a two-part camera front locating device, said camera front carrying one part and said camera body carrying the other part, said wedge-shaped member comprising a bracket having an overhanging flange of wedge shape, the spring member including a spring arm positioned to engage the flange of the bracket whereby turning movement of the camera front relative to the body may permit the spring member and bracket to pass until the wedge shape flange and spring member are engaged to frictionally hold the camera front in a picture-taking position.

5. In a collapsible camera including a camera body and a camera front having a threaded connection with the camera body on which the front may turn to and from an operable or picture-taking position, a wedge-shaped member and a spring member positioned to contact therewith forming a two-part camera front locating device, said camera front carrying one part and said camera body carrying the other part, said wedge-shaped member comprising a bracket having an overhanging flange of wedge shape, said bracket being attached to the camera front member adjacent the screw threads to extend outwardly therefrom a distance to project beyond said thread and into a position to engage the spring member carried by the camera body, the shape of the engaging parts being such that in screwing the camera front into the camera body the bracket may clear the spring arm.

6. In a collapsible camera including a camera body and a camera front having a threaded connection with the camera body on which the front may turn to and from an operable or picture-taking position, a wedge-shaped member and a spring member positioned to contact therewith forming a two-part camera front locating device, said camera front carrying one part and said camera body carrying the other part, the part carried by the camera front including a portion overhanging the threaded connection between the camera front and camera body and thereby preventing the front from being unscrewed from the camera body.

7. In a collapsible camera including a camera body and a camera front having a threaded connection with the camera body on which the front may turn to and from an operable or picture-taking position, a wedge-shaped member and a spring member positioned to contact therewith forming a two-part camera front locating device, said camera front carrying the wedge-shaped member, the camera body carrying the spring arm in a position to engage the wedge-shaped member, said spring arm being positioned to exert a thrust substantially axially of the camera front thread.

8. In a collapsible camera including a camera body and a camera front having a threaded connection with the camera body on which the front may turn to and from an operable or picture-taking position, a wedge-shaped member and a spring member positioned to contact therewith forming a two-part camera front locating device, said camera front carrying the wedge-shaped member, the camera body carrying the spring arm in a position to engage the wedge-shaped member, said spring arm being positioned to exert a thrust tending to frictionally engage threads on the camera front and camera body.

9. In a collapsible camera including a camera body and a camera front having a threaded connection with the camera body on which the front may turn to and from an operable or picture-taking position, a wedge-shaped member and a spring member positioned to contact therewith forming a two-part camera front locating device, said camera front carrying the wedge-shaped member, the camera body carrying the spring arm in a position to engage the wedge-shaped member, said spring arm being positioned to exert a thrust tending to frictionally engage threads on the camera front and camera body, and a stop on the end of the spring arm for limiting movement of the camera front relative to the camera body.

HENRY O. DROTNING